(12) United States Patent
Olivas

(10) Patent No.: US 6,791,108 B1
(45) Date of Patent: Sep. 14, 2004

(54) PROTECTIVE FULLERENE ($C_{60}$) PACKAGING SYSTEM FOR MICROELECTROMECHANICAL SYSTEMS APPLICATIONS

(75) Inventor: John D. Olivas, Redondo Beach, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 192 days.

(21) Appl. No.: 09/888,631

(22) Filed: Jun. 20, 2001

Related U.S. Application Data

(62) Division of application No. 09/310,774, filed on May 3, 1999, now Pat. No. 6,277,438.

(51) Int. Cl.[7] .............................. H01L 29/06; B05D 5/12
(52) U.S. Cl. ........................ 257/30; 250/307; 427/124; 427/155
(58) Field of Search ................... 257/30; 250/360–307; 427/122, 154–156, 264

(56) References Cited

U.S. PATENT DOCUMENTS

| | | | |
|---|---|---|---|
| 5,132,105 A | | 7/1992 | Remo |
| 5,209,916 A | | 5/1993 | Gruen |
| 5,215,841 A | | 6/1993 | Scharfe et al. |
| 5,328,676 A | | 7/1994 | Gruen |
| 5,332,723 A | | 7/1994 | Eidelloth et al. |
| 5,334,351 A | * | 8/1994 | Heinze et al. ................ 422/90 |
| 5,370,855 A | | 12/1994 | Gruen |
| 5,380,595 A | | 1/1995 | Ueba et al. |
| 5,386,048 A | | 1/1995 | West et al. |
| 5,393,572 A | | 2/1995 | Dearnaley |
| 5,411,654 A | | 5/1995 | Ahern et al. |
| 5,462,776 A | | 10/1995 | Gruen |
| 5,538,763 A | | 7/1996 | Ueba et al. |
| 5,619,035 A | * | 4/1997 | Weiss et al. ................. 250/306 |
| 5,674,632 A | | 10/1997 | Ahern et al. |
| 5,770,036 A | | 6/1998 | Ahern et al. |
| 5,876,790 A | * | 3/1999 | Kats ........................... 427/122 |
| 5,897,954 A | * | 4/1999 | Gimzewski et al. ..... 428/411.1 |
| 2002/0096633 A1 | * | 7/2002 | Gimzewski et al. ........ 250/306 |
| 2002/0109087 A1 | * | 8/2002 | Colbert et al. .............. 250/306 |

OTHER PUBLICATIONS

Joachim et al., "A Nanoscale Single–Molecule Amplifer and Its Consequences", Proceedings of the IEEE, vol. 86, No. 1, Jan. 1998, pp. 184–190.*

IBM Corp., "Molecular Brush Assembly", IBM Technical Disclosure Bulleting, vol. 37, No. 1, Jan. 1994, pp. 261–262.*

RD 368034 A, Dec. 1994.*

* cited by examiner

*Primary Examiner*—Jerome Jackson
*Assistant Examiner*—José R. Diaz
(74) *Attorney, Agent, or Firm*—John H. Kusmiss

(57) ABSTRACT

The invention involves tunneling tips to their conducting surface, and specifically the deposition of a monolayer of fullerene $C_{60}$ onto the conducting plate surface to protect the tunneling tip from contact. The Fullerene $C_{60}$ molecule is approximately spherical, and a monolayer of fullerene has a thickness of one nanometer, such that a monolayer thereby establishing the theoretical distance desired between the MEMS' tunneling tip and the conducting plate. Exploiting the electrical conductivity of $C_{60}$, the tip can be accurately positioned by simply monitoring conductivity between the fullerene and the tunneling tip. By monitoring the conductivity between the tip and the fullerene layer as the tip is brought in proximity, the surfaces can be brought together without risk of contacting the underlying conducting surface. Once the tunneling tip is positioned at the one nanometer spacing, with only the monolayer of fullerene between the tunneling tip and the conducting plate, the monolayer of $C_{60}$ can be broken down thermally and removed chemically leaving only the tunneling tip and the conducting plate at the ideal tunneling spacing. Alternatively, the properties of fullerene allow the tunneling process to occur directly across the fullerene monolayer.

14 Claims, 3 Drawing Sheets

PROTECTIVE FULLERENE ($C_{60}$) PACKAGING SYSTEM FOR MICROELECTROMECHANICAL SYSTEMS APPLICATIONS

CROSS REFERENCE TO RELATED APPLICATION

This is a divisional application of U.S. Ser. No. 09/310,774 filed on May 3, 1999, which issued as U.S Pat. No. 6,277,438.

BACKGROUND OF THE INVENTION

1. Field of the Invention

The present invention relates generally to microelectromechanical systems (MEMS), and more particularly to a protective packaging system and method whereby a one nanometer protective buffer is achieved using a monolayer of fullerene ($C_{60}$) to establish the preferred spacing of two components while protecting the components from contacting each other.

2. Description of Related Art

Fullerene $C_{60}$

Fullerenes are crystalline forms of carbon and are a relatively new discovery. A method to produce the $C_{60}$ fullerene, also known as "buckyballs," was first published by Kratschmer and Huffman in their article in Nature in 1990 (Vol. 347). The $C_{60}$ form of fullerene, depicted in FIG. 1, is comprised of sixty carbon atoms arranged to form a hollow, soccer ball-like sphere. Heretofore, fullerene has been used as a lubricant and scientists are striving to find novel uses for this unique substance.

Tunneling Tip Applications

Microelectromechanical systems, or MEMS, are miniature devices which are seeing their use in a wide variety of experimental and commercial applications. Tunneling tip MEMS have been demonstrated as being feasible for use as accelerometers, pressure sensors, seismometers, thermal sensors, and microphones among others. In the manufacture of MEMS, an electrically biased tunneling tip is used to drive electrons from the tunneling tip to a metal conducting plate. A MEMS tunneling tip device of this type can include a pyramidal metal tip that faces an electrically conducting plate or diaphragm across the tunneling gap.

The tunneling tip is positioned either manually or electrically to a preferred distance of one nanometer from the plate, and a bias voltage induces a current between the tunneling tip and the conducting plate as electrons are transferred from the tip to the plate. When a current is detected, the tip is assumed to be positioned one nanometer from the conducting plate. Currently, the technology which is used to position the tunneling tip relies on electrical feedback from the tip-plate system, but such feedback is difficult to maintain during fabrication and assembly. Both the tunneling tip and the conducting plate are typically gold because of gold's passive characteristics, but the use of gold poses a problem in positioning the tunneling tip with respect to the conducting plate. Accidental contact between the gold tunneling tip and the gold conducting plate can severely damage the components, in effect ruining the MEMS device. On occasion components which appear to have been successfully fabricated often were seen to have failed due to tip-plate crashing. Even where the tip is properly positioned relative to the conducting plate, the variation in sealing of the package is in many cases appreciable enough to cause the tip portion to be compromised thereby rendering the device inoperable.

SUMMARY OF THE INVENTION

The invention involves the deposition of a monolayer of $C_{60}$ fullerene onto the conducting plate surface to protect the tip and conducting surface from premature contact (and subsequent damage). The Fullerene $C_{60}$ molecule is approximately spherical and bonds weakly to neighboring molecules. A monolayer of fullerene has a thickness of one nanometer, automatically establishing the theoretical distance desired between the MEMS' tunneling tip and the conducting plate. It would still be necessary to position the tip and diaphragm as in current fabrication process, but tunneling current would no longer be used to position the tip; instead, exploiting the electrical conductivity of $C_{60}$, one simply monitors for contact between the tip and the fullerene film as indicated by the onset of electrical conductance between them. By monitoring the conductivity between the tip and the fullerene layer as the tip is brought in proximity, the surfaces can be brought together without risk of contacting the conducting surfaces. Once the tunneling tip is positioned at the one nanometer spacing, with only the monolayer of fullerene between the tunneling tip and the conducting plate, the monolayer of $C_{60}$ can be broken down thermally and removed chemically leaving only the tunneling tip and the conducting plate at the ideal tunneling spacing. Alternately, the monolayer of fullerene can be left in place and the tunneling operation can occur directly across the fullerene cage.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide protective padding for microelectromechanical systems which advantageously establishes a protective layer having a critical spacing for tunneling applications.

Current MEMS technology requires tunneling tips and conductive surfaces such as diaphragms to be manually moved together until a tunneling current is established. At this point, the distance between the tip and diaphragm is theoretically one nanometer. Rather than manually setting the device by physically moving the two surfaces close together, the present invention teaches the use of a removable spacer layer to protect the tunneling tip from crashing into the diaphragm. Using fullerene $C_{60}$ as the spacer layer, an exact one nanometer distance can be established due to the molecular diameter of the $C_{60}$ cage being exacting one nanometer. Once the microelectromechanical system has been built, thermal and electrical energy can be used to cause molecular breakdown of the fullerene layer. Since studies have shown that under certain energetic situations fullerenes exhibit an "antifuse" property, it is possible to destroy the fullerene protective layer once the device has been deployed in its intended environments. Since the diaphragm surface would then be effectively contaminated with the residue of the non-destroyed protective layer, the surface may be treated to remove the carbonaceous soot and graphite left behind. Using thermal desorption and gettering of the newly created gasses to another surface, the contaminants are removed from the tunneling tip region. This can be performed either immediately after fabrication or after the component has been safely delivered to its destination.

Figure 1:
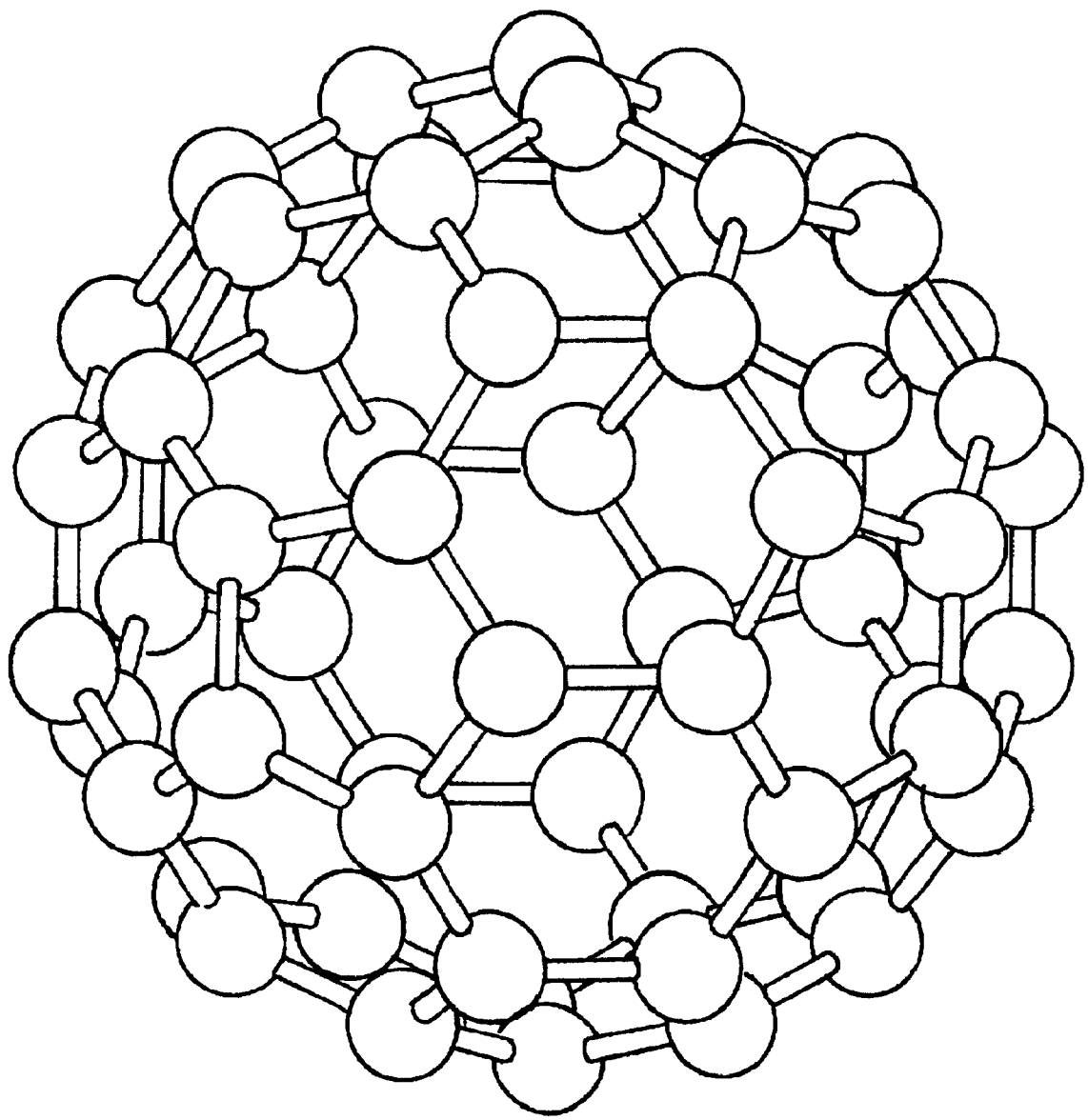
FIG. 1 is a depiction of a Fullerene $C_{60}$ molecule.
Figure 2:
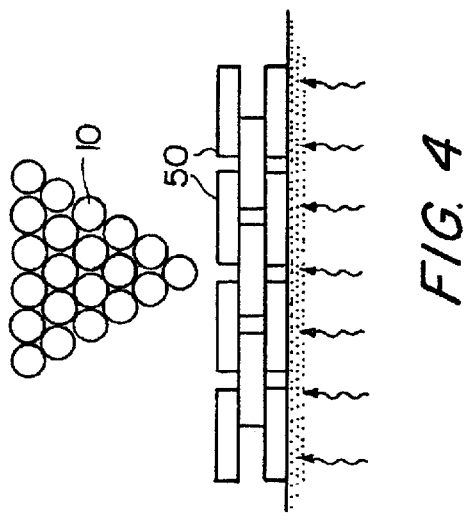
FIG. 2 is a schematic of a tunneling tip contacting a monolayer of fullerene.

As shown if FIG. 2, the first step is to deposit a monolayer 20 of $C_{60}$ fullerene on the conductive surface of a MEMS diaphragm. It has been demonstrated that $C_{60}$ may be deposited onto a gold surface via sublimation. Additionally, $C_{60}$ is weakly chemisorbed on gold surfaces at room temperatures, however, bonding can be increased by annealing the surface if initial bond strengths are insufficient.

Once the protective layer has been deposited, the microelectromechanical device can be assembled as is normally done. Rather than monitoring tunneling current to determine optimized tip distance from the diaphragm, monitoring conductivity (indicated schematically by arrow 40) will also reveal the ideal distance since the diameter of $C_{60}$ is exactly one nanometer and the molecules are electrically conductive.

Figure 3:
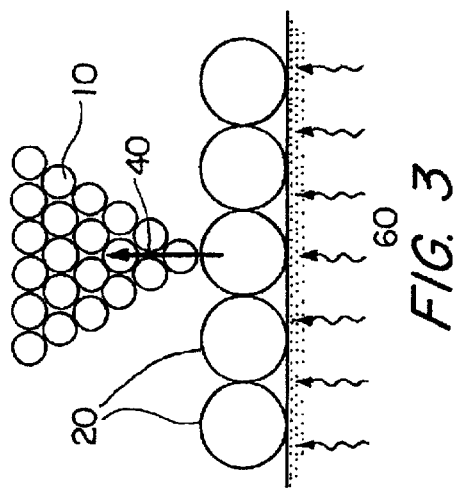
FIG. 3 is a schematic of a step in which energy is transmitted to the fullerene monolayer.
Figure 4:
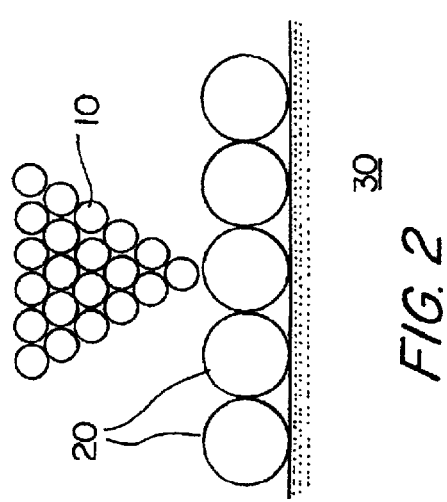
FIG. 4 is a schematic of breakup of the fullerene monolayer due to the energy transmitted.
Figure 5:
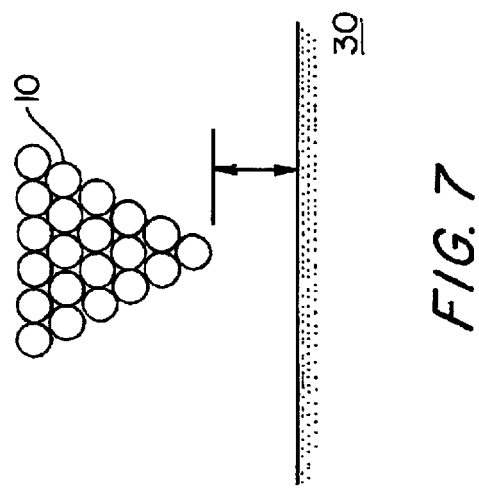
FIG. 5 is a schematic of an introduction of a suitable gas in the region of the fullerene monolayer byproducts.

Once the tunneling tip 10 is positioned, the monolayer, as shown in FIG. 3, may be removed through the applications of thermal and/or electrical energy to the substrate, indicated by arrows 60. Where the energy of desorption of fullerene to the substrate surface is greater than the thermal input to the substrate, a bias created between the tunneling tip and substrate initiates molecular fragmentation 50 of the fullerene system as shown in FIGS. 4 and 5. Due to the relatively good electrical conductivity of fullerenes, a sufficient region around the tip would become electrically charged as the current is passed from the tip to the diaphragm surface. After a critical amount of thermal and/or electrical energy is supplied to the fullerene film, molecular breakdown of the fullerene will yield graphite and soot in the region of the tip.

Figure 8:
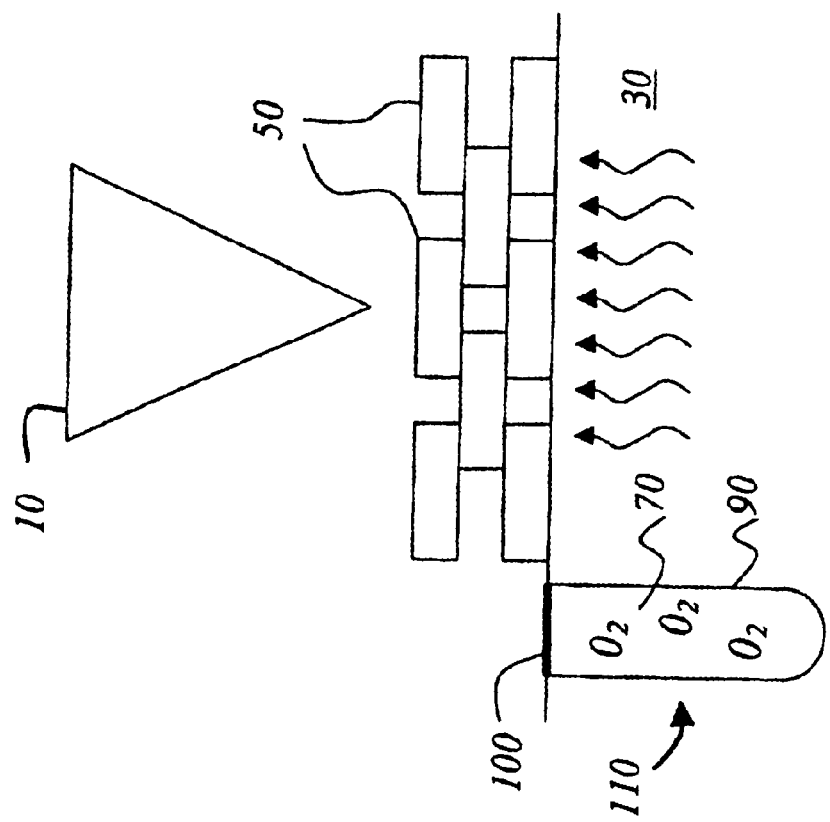
FIG. 8 is a schematic showing a single event pipe with the one event valve closed to retain the dose amount of gas.
Figure 9:
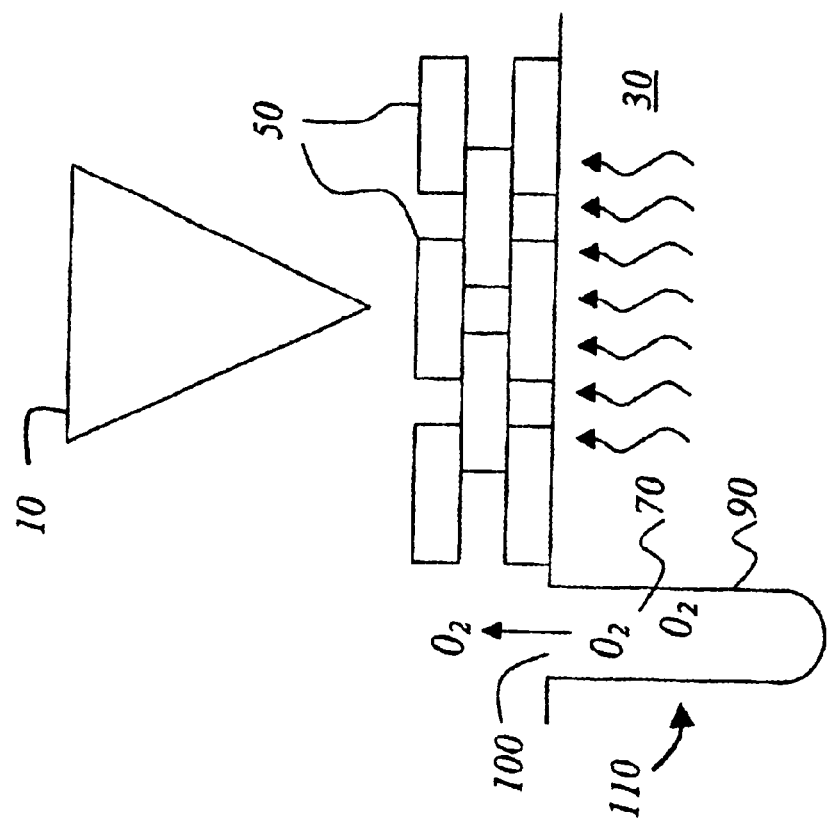
FIG. 9 is a schematic showing a single event pipe with the one event valve open to release the dose amount of gas.

With the substrate surface 30, and the carbonaceous contamination still thermally energetic, a dose amount of gas 70 is released (FIGS. 5 and 9). The gas, which may be oxygen, hydrogen, or any suitable gas which reacts with the carbon byproducts of the prior step, is supplied by a pipe channel 90 sealed by a one event valve 100. These single event pipes 110 and one event valves 100 are well known and commonly fabricated in microelectromechanical systems. FIG. 8 shows a single event pipe 110 with the one event valve 100 closed to retain the dose amount of gas 70. FIG. 9 shows the single event pipe 10 with the one event valve 100 open to release the dose amount of gas 70.

Figure 6:
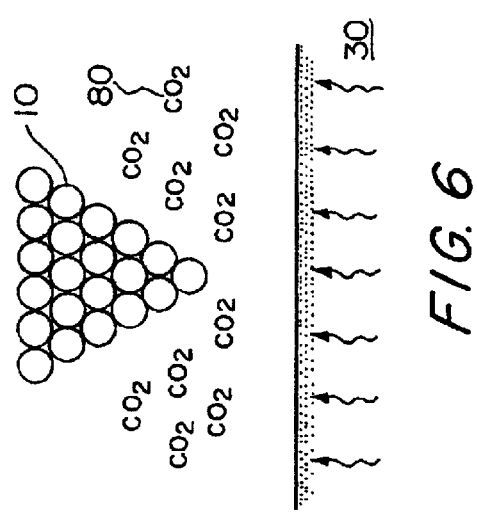
FIG. 6 is a schematic of the interaction of the gas with the byproducts.
Figure 7:
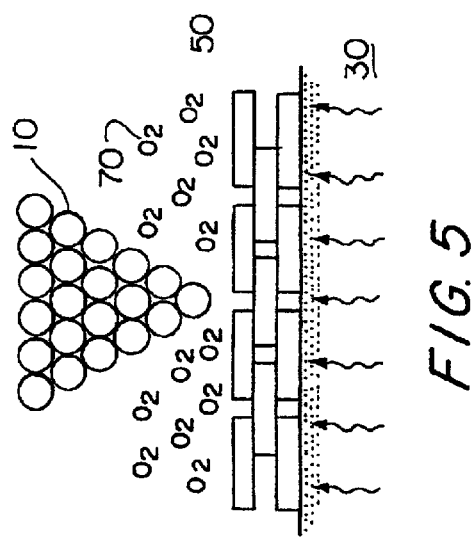
FIG. 7 is a schematic of the resulting spacing of the tunneling tip after evacuation of the gases.

After the device has reached its destination, the fullerene layer 20 can be energized with the thermal and/or electrical energy. The one event valve 100 can then be opened, and the gas within the pipe channel 90 fills the cavity between the diaphragm and the tip 10. The resulting interaction of the gas 70 with the carbonaceous contaminants 50 reacts to form a stable molecular gas 80, such as carbon monoxide and carbon dioxide, represented by CO and $CO_2$ in FIG. 6. Using a prefabricated sacrificial surface (not shown) away from the tunneling device, these gases can be drawn to preferentially adsorb onto the sacrificial surface, leaving the region around the tunneling tip region free of adsorbed gases, fullerenes, or carbonaceous contaminants as shown in FIG. 7. The process thus not only provides one nanometer padding to protect the delicate components, but ensures exact spacing necessary for the optimum operation of the system.

A key characteristic of $C_{60}$ is its robust and highly elastic nature which permit multiple cycles of operation, and it can reversibly tolerate a force in excess of 10 nano-Newtons. When connected between a metallic surface and a metallic tunneling tip, $C_{60}$ displays linear current-voltage characteristics. For bias much lower than the applied force of 1 nN, a 0.14 nm decrease in the diameter of the fullerene molecular cage (which is 7.1 Å without any force) is induced. Thus, if a single fullerene molecule is introduced in the junction, it can act as a mechanical buffer stabilizing the junction, permitting multiple operation cycles without tip and diaphragm modifications. Furthermore, the $C_{60}$ in the gap can also serve as the mechanism for electron transport from the tip to the conducting surface. In other words, the electrical conductivity of the fullerene supports electron transport such that, if desired, the fullerene monolayer does not have to be removed prior to the tunneling operation. There describes virtual resonance tunneling, and the variation of the current density flowing through the junction is two orders of magnitude per angstrom. A subnanometer variation in the tip altitude can be obtained by applying several millivolts to the piezoelectric element connected to the end of the tip. Consequently, a mechanically adjustable junction formed by the tip-$C_{60}$-metallic surface is an electrical circuit element that amplifies a signal applied to the piezo bias voltage. A fullerene molecule is especially suited for this gap because it has the proper spacing of approximately one nanometer, and further because it was found that moderate compression does not force the fullerene molecules to escape the tip by lateral motion nor change its overall configuration.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:
1. A microelectromechanical system (MEMS) device including a diaphragm comprising a conducting surface, the MEMS device, further comprising:
   exactly one layer of $C_{60}$ fullerene on the conducting surface; and
   a single event pipe containing a gas that reacts with carbon byproducts produced after the exactly one layer of $C_{60}$ fullerene is broken down into carbon by products.
2. The MEMS device of claim 1, wherein the conducting surface includes gold.
3. The MEMS device of claim 2, where the $C_{60}$ fullerene is deposed on the gold surface by sublimation.

4. The MEMS device of claim 2 where the $C_{60}$ fullerene is deposited on the gold surface by chemisorbtion.

5. A mechanically adjustable electron tunneling tip spacing system comprising:

a tunneling tip including a piezoelectric element connected to an end of the tunneling tip;

a MEMS device including a conducting surface opposed the tunneling tip;

a single layer of $C_{60}$ fullerene between the tunneling tip and the MEMS device conducting surface, the single layer of $C_{60}$ fullerene comprising a spacer layer for establishing a predetermined spacing between the tunneling tip and the MEMS device conducting surface; and a single event pipe containing a gas that reacts with carbon byproducts, wherein the gas from the single event pipe reacts with the single layer of $C_{60}$ fullerene between the tunneling tip and the MEMS device conducting surface after the single layer of $C_{60}$ fullerene is broken down into carbon byproducts.

6. A system for providing a predetermined spacing between a conducting surface and a tunneling tip to form a tunneling device, comprising:

a substrate including a conducting surface;

a spacer layer having a predetermined thickness and having a first side and a second side, the first side of the spacer layer being disposed to contact the conducting surface;

a tunneling tip being disposed to contact the second side of the spacer layer, the tunneling tip being set in position opposed to the conducting surface to form a tunneling device, the distance between the tunneling tip and the conducting surface being the predetermined thickness;

an energy application member for applying energy to the substrate to cause a breakdown of the spacer layer between the tunneling tip and the conducting surface to produce a spacer layer residue; and a single event pipe containing a first gas for reacting with the spacer layer residue, wherein when the single event pipe is opened the first gas is released to fill a cavity between the tunneling tip and the conducting surface, a predetermined portion of the first gas reacts with the spacer layer residue in the cavity between the tunneling tip and the conducting surface to produce a second gas.

7. The system of claim 6, wherein the spacer layer comprises a monolayer of molecules with the predetermined thickness being the thickness of one molecule.

8. The system of claim 6, wherein the predetermined thickness is one nanometer.

9. The system of claim 7, wherein the spacer layer comprises $C_{60}$ fullerene.

10. The system of claim 6, wherein the energy application member applies thermal energy.

11. The system of claim 6, wherein the energy application member applies electrical energy.

12. The system of claim 6, further comprising:

a prefabricated sacrificial surface away from the tunneling device, the prefabricated sacrificial surface for adsorbing the first and second gases leaving the region around the tunneling tip free of adsorbed gases and spacer layer residue.

13. The system of claim 6, wherein the first gas reacts with carbon byproducts.

14. The system of claim 6, wherein the first gas is selected from the group comprising oxygen and hydrogen.

* * * * *